(12) United States Patent
Hiltmann et al.

(10) Patent No.: US 7,486,252 B2
(45) Date of Patent: Feb. 3, 2009

(54) TEXTILE STRIP COMPRISING AN INTEGRATED ANTENNA THREAD FOR AN RF TRANSPONDER

(75) Inventors: Andreas Hiltmann, Rheinfelden (CH); Francisco Speich, Gipf-Oberfrick (CH)

(73) Assignee: Textilma AG (CH)

( * ) Notice: Subject to any disclaimer, the term of this patent is extended or adjusted under 35 U.S.C. 154(b) by 48 days.

(21) Appl. No.: 11/660,890

(22) PCT Filed: Aug. 19, 2005

(86) PCT No.: PCT/CH2005/000484

§ 371 (c)(1),
(2), (4) Date: Feb. 22, 2007

(87) PCT Pub. No.: WO2006/029543

PCT Pub. Date: Mar. 23, 2006

(65) Prior Publication Data
US 2008/0007479 A1   Jan. 10, 2008

(30) Foreign Application Priority Data
Sep. 14, 2004 (CH) .................................. 1503/04

(51) Int. Cl.
*H01Q 1/36* (2006.01)
(52) U.S. Cl. ...................... 343/897; 343/895
(58) Field of Classification Search ............ 343/897
See application file for complete search history.

(56) References Cited

U.S. PATENT DOCUMENTS

| 4,754,285 | A | 6/1988 | Robitaille |
| 5,906,004 | A | 5/1999 | Lebby et al. |
| 6,080,690 | A * | 6/2000 | Lebby et al. ............... 442/209 |
| 6,154,138 | A | 11/2000 | Nilsson |
| 6,677,917 | B2 | 1/2004 | Van Heerden et al. |
| 6,727,197 | B1 * | 4/2004 | Wilson et al. ............... 442/301 |
| 7,238,632 | B2 * | 7/2007 | Orita et al. ................. 442/317 |
| 2003/0211797 | A1 | 11/2003 | Hill et al. |

FOREIGN PATENT DOCUMENTS

| EP | 0 288 676 A1 | 11/1988 |
| JP | 03 155 088 A | 7/1991 |
| WO | WO 01/36728 | 5/2001 |
| WO | WO 2005/071605 A | 8/2005 |

* cited by examiner

Primary Examiner—Trinh V Dinh
(74) Attorney, Agent, or Firm—George Pappas

(57) ABSTRACT

The invention relates to a textile strip comprising an integrated antenna thread for an RF transponder. The aim of the invention is to produce a textile strip in a simple, flexible manner and to avoid the risk of short-circuits. To achieve this, the strip is configured from a base textile (2, 2a) that is produced on a needle loom. The antenna thread (4, 4a, 4b) is laid on the base textile in an undulating or zigzag form during the production of said textile, the distance between the limbs (14a, 14b) of an antenna thread loop and at least one edge (8) of the strip being two weft threads.

14 Claims, 2 Drawing Sheets

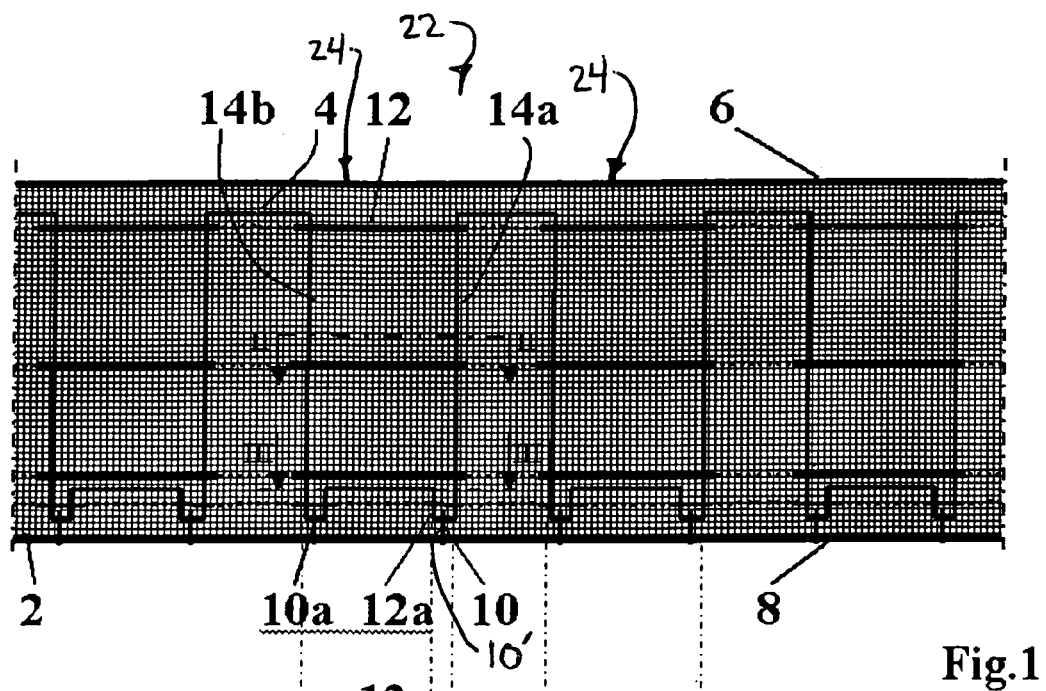
Fig.1
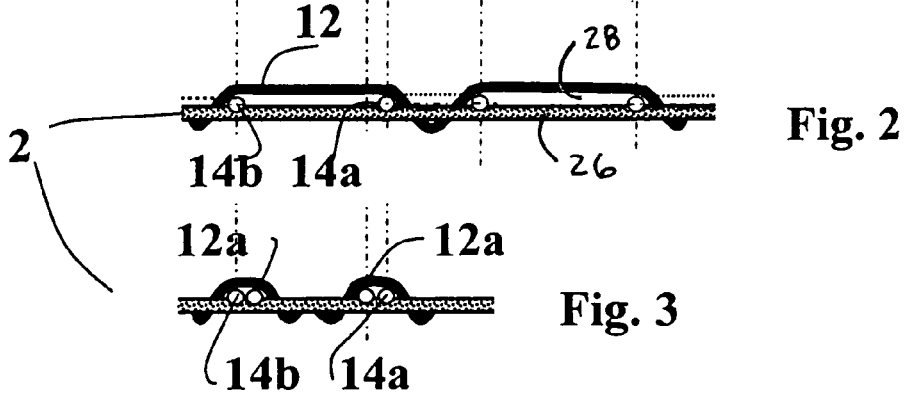
Fig. 2
Fig. 3
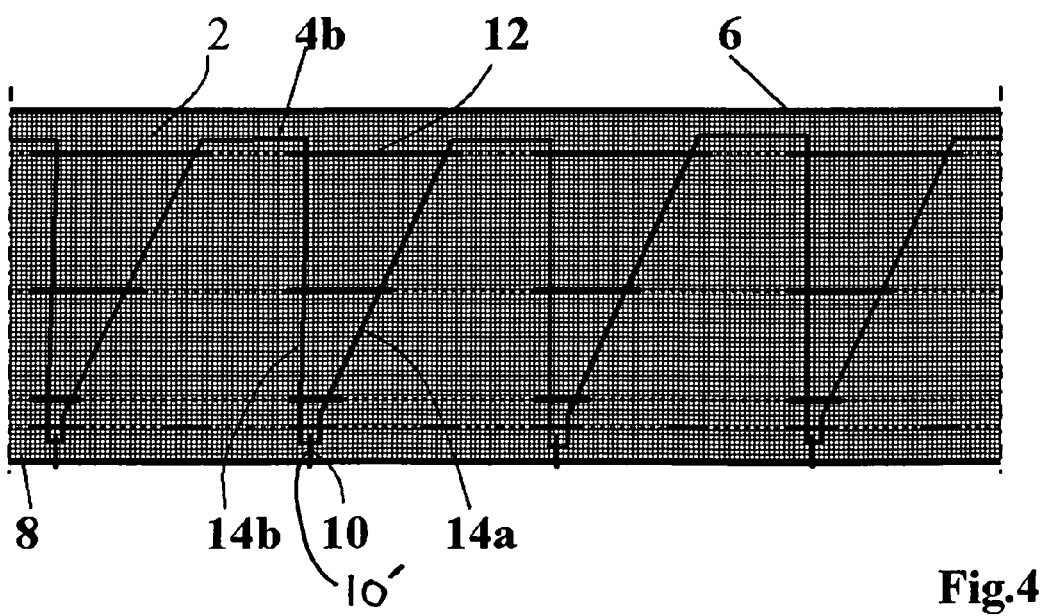
Fig.4

TEXTILE STRIP COMPRISING AN INTEGRATED ANTENNA THREAD FOR AN RF TRANSPONDER

This application claims priority of PCT application PCT/CH2005/000484 having a priority date of Sep. 14, 2004, the disclosure of which is incorporated herein by reference.

FIELD OF THE INVENTION

The invention relates to a textile strip comprising an integrated antenna thread for an RF transponder.

BACKGROUND OF THE INVENTION

A textile strip of the type mentioned initially is known, for example, from WO0136728. There, for example, conductor tracks serving as antennae are introduced, inter alia, as successive wefts of a basic fabric. The disadvantage of this is that the individual limbs of the conductor thread lie closely to one another, and there is the constant risk of short circuits, insofar as the conductor threads are not provided with complicated insulation.

U.S. Pat. No. 6,677,917 discloses fabrics, such as, for example, articles of clothing, to which, for example, radio frequency transponders, what are known as RF transponders, can be fastened, and which have an integrated antenna. However, this does not describe in detail how such an antenna thread is to be fastened to a fabric.

SUMMARY OF THE INVENTION

The object of the invention is to specify a textile strip, in which an antenna thread can be integrated during production, the risk of short circuits in the antenna thread being avoided.

By the antenna thread being arranged on a basic fabric, the antenna thread can in a simple way, on the one hand, be connected to the basic fabric and, on the other hand, be attached in a meander-shaped or zigzag-shaped manner, so that the required length of the antenna thread can be distributed over a relatively short portion of the textile strip. Since the spacing of the limbs of an antenna thread loop at least one strip edge amounts to at least two wefts of the basic fabric, moreover, this ensures that adjacent limbs of the antenna thread do not touch one another, thus ruling out short circuits which would adversely influence the required length of the antenna thread.

The antenna thread may have at fastening points loops through which a basic fabric weft runs. This design is relatively simple, but has the disadvantage that the tie-up point of the antenna thread is visible on the other side of the basic fabric.

The refinement is more advantageous, according to which the antenna thread is arranged in the manner of a weft thread loop. This is inserted at one strip edge and is fastened at the other strip edge by means of at least one stitch. To secure the antenna thread to the basic fabric, there is in each case at least one floating warp thread which is arranged above each pair of limbs of each antenna thread loop. It is particularly advantageous if, a warp thread floating over the antenna thread is designed so as to be adhesive or fusible and is adhesively bonded or fused to the antenna thread in a punctiform manner.

The length of the antenna thread is coordinated in a known way with the RF transponder to be arranged.

The refinement is particularly advantageous, according to which the textile strip is designed as a label strip 22 which, as a rule, has a plurality of labels 24, each label containing an antenna thread of predetermined length. The individual labels are then detached from the label strip and form individual labels. Each such label may be or become equipped with a corresponding RF transponder.

BRIEF DESCRIPTION OF THE DRAWINGS

Exemplary embodiments of the invention are described in more detail below with reference to the drawings in which:

FIG. 1 shows a textile strip with an antenna thread arranged in a meander-shaped manner, in a top view;

FIG. 2 shows the textile strip of FIG. 1 in the section II-II;

FIG. 3 shows the textile strip of FIG. 1 in the section III-III;

FIG. 4 shows a further textile strip with an antenna thread arranged in a zigzag-shaped manner, in a top view.

DETAILED DESCRIPTION OF THE INVENTION

Figure 5:
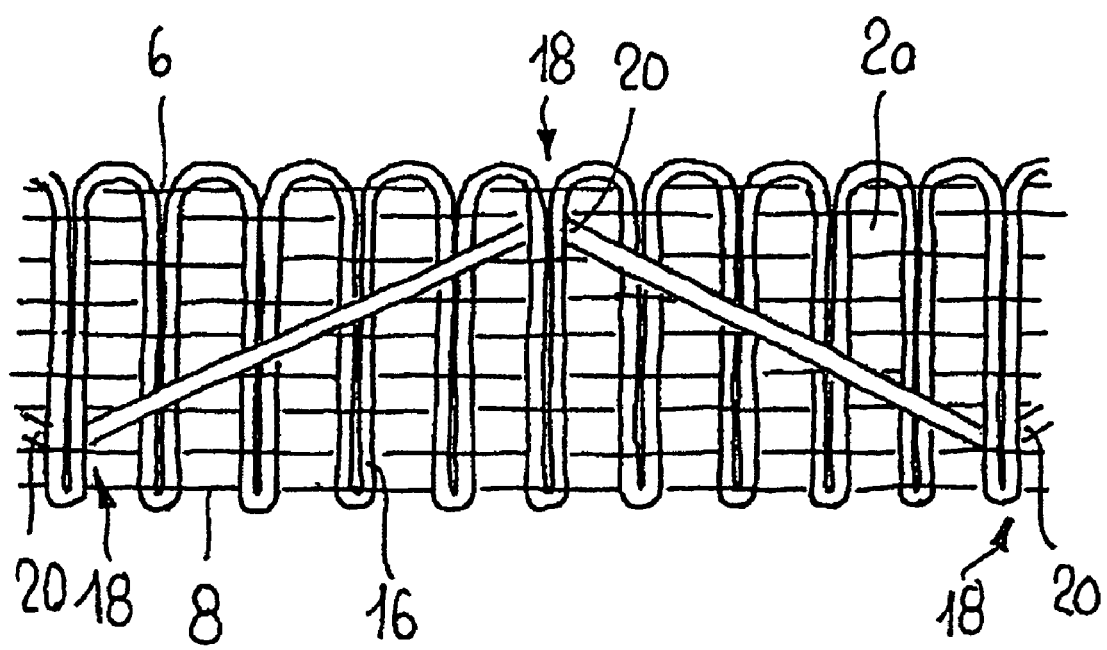
FIG. 5 shows a further textile strip with an antenna thread arranged in a zigzag-shaped manner, in a top view.

FIGS. 1 to 3 show a detail of a textile strip, the basic fabric 2 of which has been produced in the usual way on a needle loom. The basic fabric has warp threads, not illustrated in any more detail, in which are tied in weft thread loops, likewise not illustrated in any more detail, which are introduced in a known way from one side by means of a weft insertion needle and on the other side are tied off by means of a knitting needle. In this case, the weft thread loops may be tied off by means of the knitting needle in various ways in that the weft thread loops are secured either to themselves or by means of an auxiliary thread.

An antenna thread 4 is arranged in a meander-shaped manner on this basic fabric 2. The antenna thread 4 is arranged in the manner of a weft thread loop, being inserted from one strip edge 6 and being fastened on the other strip edge 8 in each case by means of a stitch 10. To secure the antenna thread 4, there are floating warp threads 12 which run in each case over the pairs of limbs 14a, 14b of an antenna thread loop, as may be gathered particularly from FIGS. 2 and 3. The floating warp threads are preferably designed so as to be adhesive or fusible and are adhesively bonded or fused to the antenna thread in a punctiform manner.

In the example of FIGS. 1 to 3, the limbs 14a, 14b of the antenna thread loops run parallel, and the spacing of the limbs amounts at both strip edges 6, 8 to a plurality of wefts of the basic fabric.

To produce such a textile strip having an antenna thread, there are, for example, needle looms and weft insertion needles, such as are described, for example, in DE 24 00 101 C, EP 0 121 648 A, GB 2 146 665 A, U.S. Pat No. 5,564,477 A and CH 663 629 A. To insert the antenna thread loop, the operation of weaving the basic fabric 2 is stopped, and an auxiliary shed is formed from the floating warp threads 12 and the warp threads 26 of the basic fabric, an antenna thread loop then being inserted into said auxiliary shed from the strip edge 6 and being tied off at the opposite strip edge 8 by means of an auxiliary thread 10' so as to form the stitch 10. This auxiliary shed then remains open over as many wefts of the basic fabric as are necessary to achieve the desired spacing of the limbs 14a, 14b of the antenna thread loop. A renewed stopping of the operation of weaving the basic fabric then takes place, and a tie-off of the antenna thread loop by means of a second stitch 10a, whereupon the auxiliary shed is closed. An auxiliary shed 28 is illustrated in FIG. 2 after it has been closed. The antenna thread loop may also be fastened by means of more than two stitches 10, 10a. A separate warp thread 12a runs over each stitch 10, 10a. For each insertion of an antenna thread loop, the operation is repeated, until the desired length of the antenna thread is arranged.

FIG. 4 shows a further textile strip which is constructed and produced in a similar way to the textile strip of FIGS. 1 to 3, although, in this case, the antenna thread 4b runs in a zigzag-shaped manner. For this purpose, the inserted antenna thread loop is tied off at the strip edge 8 by means of only one stitch 10. The limbs 14a, 14b of an antenna thread loop have the spacing of one weft at one strip edge 8 and the spacing of a plurality of wefts of the basic fabric at the other strip edge 6 only.

FIG. 5 shows a further example of a textile strip, the basic fabric 2a of which has been produced on a needle loom. For this purpose, basic fabric wefts 16 are inserted from one strip edge 6 and are tied off at the other strip edge 8 by means of a knitting needle in a way not illustrated in any more detail, but known, as is shown, for example, in CH 490 541. An antenna thread 4b is arranged in a zigzag-shaped manner on the basic fabric 2a. At the connection points 18, the antenna thread 4b forms loops 20 through which the basic fabric weft 16 is led. The production of this textile strip takes place, for example, according to CH 490 541, in that the antenna thread 4b is supplied above the warp shed and introduced in each case at the fastening points into the open fabric shed by means of a dagger, so that the corresponding basic fabric weft 16 can penetrate and fasten the loop 20. This fastening technique, on the one hand, is relatively complicated and, on the other hand, has the disadvantage that the loop 20 of the antenna thread 4b is visible on the opposite side of the textile strip. Here, too, as in the example of FIG. 4, the spacing of the limbs of an antenna thread loop amounts at one strip edge to only one weft of the basic fabric and at the other strip edge to a plurality of wefts of the basic fabric.

The textile strip is preferably designed as a known label strip carrying successive labels which may be provided with printed-on and/or woven-in images and characters. Such a label strip is likewise subdivided in a known way into individual labels.

Such labels may be equipped, for example, with an RF transponder which is designed for 868 MHz and requires an adapted antenna thread which is approximately 17 cm long.

LIST OF REFERENCE SYMBOLS

2 Basic fabric
2a Basic fabric
4 Antenna thread
4a Antenna thread
4b Antenna thread
6 Strip edge
8 Strip edge
10 Stitch
10a Stitch
12 Floating warp thread
12a Floating warp thread
14a Limb
14b Limb
16 Basic fabric weft
18 Connection point
20 Loop

The invention claimed is:

1. A method for producing a textile strip comprising an integrated antenna thread for an RF transponder, a basic fabric being produced by an operation of weaving on a needle loom by means of weft insertion needles, on which basic fabric the antenna thread is arranged in a meander-shaped or zigzag-shaped manner simultaneously with the production of the basic fabric, the limbs of an antenna thread loop have spacing of at least two wefts of the basic fabric at at least one strip edge, with the steps of:

stopping the operation of weaving the basic fabric and forming an auxiliary shed from floating warp threads and warp threads of the basic fabric, inserting the antenna thread loop into said auxiliary shed from the strip edge and forming a tie off at the opposite strip edge by means of an auxiliary thread, so as to form a stitch, whereby the operation of weaving is continued for at least two weft threads of the basic fabric with said auxiliary shed remaining open, whereupon the auxiliary shed is closed and continuing the operation of weaving the basic fabric until another antenna thread loop is inserted, said steps being repeated for each insertion of an antenna thread loop until the desired length of the antenna thread is arranged.

2. The method as claimed in claim 1, wherein the antenna thread loop is tied off by means of a second stitch.

3. The method as claimed in claim 2, wherein a warp thread floating over the antenna thread is designed so as to be adhesive or fusible and is adhesively bonded or fused to the antenna thread in a punctiform manner.

4. The method as claimed in claim 2, characterized in that the length of the antenna thread is coordinated with the RF transponder to be arranged.

5. The method as claimed in claim 2, characterized in that the textile strip is designed as a label strip with a plurality of labels.

6. The method as claimed in claim 2, wherein said antenna thread loop is tied off by means of more than two stitches.

7. The method as claimed in claim 1, wherein a warp thread floating over the antenna thread is designed so as to be adhesive or fusible and is adhesively bonded or fused to the antenna thread in a punctiform manner.

8. The method as claimed in claim 7, characterized in that the length of the antenna thread is coordinated with the RF transponder to be arranged.

9. The method as claimed in claim 7, characterized in that the textile strip is designed as a label strip with a plurality of labels.

10. The method as claimed in claim 1, characterized in that the length of the antenna thread is coordinated with the RF transponder to be arranged.

11. The method as claimed in claim 10, characterized in that the textile strip is designed as a label strip with a plurality of labels.

12. The method as claimed in claim 1, characterized in that the textile strip is designed as a label strip with a plurality of labels.

13. A label strip comprising an integrated antenna thread for an RF transponder, characterized in that it is produced according to claim 12, and each label contains an antenna thread of predetermined length.

14. A label strip comprising an integrated antenna thread for an RF transponder, characterized in that it is produced according to claim 1, and each label contains an antenna thread of predetermined length.

* * * * *